(12) United States Patent
Engel

(10) Patent No.: US 7,505,049 B2
(45) Date of Patent: Mar. 17, 2009

(54) INSTRUMENTATION

(75) Inventor: Damon Gabriel Engel, Hamilton (NZ)

(73) Assignee: Deep Video Imaging Limited, Auckland (NZ)

( * ) Notice: Subject to any disclaimer, the term of this patent is extended or adjusted under 35 U.S.C. 154(b) by 0 days.

(21) Appl. No.: 10/489,101

(22) PCT Filed: Sep. 11, 2002

(86) PCT No.: PCT/NZ02/00175

§ 371 (c)(1),
(2), (4) Date: Sep. 21, 2004

(87) PCT Pub. No.: WO03/023491

PCT Pub. Date: Mar. 20, 2003

(65) Prior Publication Data

US 2005/0063055 A1 Mar. 24, 2005

(30) Foreign Application Priority Data

Sep. 11, 2001 (NZ) .................................. 514119

(51) Int. Cl.
*G09G 5/00* (2006.01)
(52) U.S. Cl. .......................................... 345/629; 345/4
(58) Field of Classification Search ...................... 701/8, 701/9; 345/4–6, 618, 31, 629
See application file for complete search history.

(56) References Cited

U.S. PATENT DOCUMENTS

| | | | |
|---|---|---|---|
| 3,940,788 A | 2/1976 | Abe et al. | |
| 3,967,881 A | 7/1976 | Moriyama et al. | |
| 4,153,654 A | 5/1979 | Maffitt et al. | |
| 4,239,349 A | 12/1980 | Scheffer | |
| 4,333,715 A | 6/1982 | Brooks | |
| 4,371,870 A | * 2/1983 | Biferno ........................ 345/4 |
| 4,423,929 A | 1/1984 | Gomi | |
| 4,443,062 A | 4/1984 | Togashi et al. | |
| 4,447,141 A | 5/1984 | Eisenkraft | |
| 4,472,737 A | 9/1984 | Iwasaki | |
| 4,523,848 A | 6/1985 | Gorman et al. | |
| 4,556,286 A | 12/1985 | Uchida et al. | |

(Continued)

FOREIGN PATENT DOCUMENTS

AU 82482/98 9/1998

(Continued)

OTHER PUBLICATIONS

Ishii, H., Kobayashi, M., and Arita K., "Interative Design of Seamless Collaboration Media," Aug. 1994/vol. 37, No. 8 Communications of the ACM.

(Continued)

*Primary Examiner*—Kee M Tung
*Assistant Examiner*—Michelle K. Lay

(57) ABSTRACT

A method of displaying information on an instrument for viewing by a user includes the steps of a) displaying information on a first focal plane, and b) moving the information displayed on the first focal plane to a different focal plane when an alarm or critical situation arises, and c) then moving the information back to the first focal plane, and d) repeating steps b) and c) in order that the viewer of the instrument becomes aware of the displayed information.

17 Claims, 3 Drawing Sheets

U.S. PATENT DOCUMENTS

| | | | |
|---|---|---|---|
| 4,568,928 A * | 2/1986 | Biferno | 345/5 |
| 4,613,896 A | 9/1986 | Takita et al. | |
| 4,648,691 A | 3/1987 | Oguchi et al. | |
| 4,649,425 A | 3/1987 | Pund | |
| 4,712,869 A | 12/1987 | Claxton John C. | |
| 4,757,626 A | 7/1988 | Weinreich | |
| 4,927,240 A | 5/1990 | Stolov et al. | |
| 4,947,257 A | 8/1990 | Fernandez et al. | |
| 5,046,826 A | 9/1991 | Iwamoto et al. | |
| 5,046,827 A | 9/1991 | Frost et al. | |
| 5,049,870 A | 9/1991 | Fitzgerald et al. | |
| 5,075,993 A | 12/1991 | Weinreich | |
| 5,091,720 A | 2/1992 | Wood | |
| 5,112,121 A | 5/1992 | Chang et al. | |
| 5,113,272 A | 5/1992 | Reamey | |
| 5,124,803 A | 6/1992 | Troxel | |
| 5,198,936 A | 3/1993 | Stringfellow | |
| 5,255,028 A | 10/1993 | Biles | |
| 5,255,356 A | 10/1993 | Michelman et al. | |
| 5,261,404 A | 11/1993 | Mick et al. | |
| 5,283,560 A | 2/1994 | Bartlett | |
| 5,289,297 A | 2/1994 | Bollman et al. | |
| 5,300,942 A | 4/1994 | Dolgoff | |
| 5,317,686 A | 5/1994 | Salas et al. | |
| 5,333,255 A | 7/1994 | Damouth | |
| 5,337,181 A | 8/1994 | Kelly | |
| 5,367,801 A | 11/1994 | Ahn | |
| 5,416,890 A | 5/1995 | Beretta | |
| 5,416,895 A | 5/1995 | Anderson et al. | |
| 5,418,898 A | 5/1995 | Zand et al. | |
| 5,432,626 A | 7/1995 | Sasuga et al. | |
| 5,463,724 A | 10/1995 | Anderson et al. | |
| 5,465,101 A | 11/1995 | Akiba et al. | |
| 5,473,344 A | 12/1995 | Bacon et al. | |
| 5,475,812 A | 12/1995 | Corona et al. | |
| 5,502,805 A | 3/1996 | Anderson et al. | |
| 5,515,484 A | 5/1996 | Sfarti et al. | |
| 5,537,233 A | 7/1996 | Miura et al. | |
| 5,585,821 A | 12/1996 | Ishikura et al. | |
| 5,590,259 A | 12/1996 | Anderson et al. | |
| 5,600,462 A | 2/1997 | Suzuki et al. | |
| 5,604,854 A | 2/1997 | Glassey | |
| 5,623,591 A | 4/1997 | Cseri | |
| 5,638,501 A | 6/1997 | Gough et al. | |
| 5,651,107 A | 7/1997 | Frank et al. | |
| 5,663,746 A | 9/1997 | Pellenberg et al. | |
| 5,664,127 A | 9/1997 | Anderson et al. | |
| 5,675,755 A | 10/1997 | Trueblood | |
| 5,694,532 A * | 12/1997 | Carey et al. | 345/419 |
| 5,706,139 A | 1/1998 | Kelly | |
| 5,721,847 A | 2/1998 | Johnson | |
| 5,745,197 A | 4/1998 | Leung et al. | |
| 5,757,522 A | 5/1998 | Kulick et al. | |
| 5,764,317 A | 6/1998 | Sadovnik et al. | |
| 5,796,455 A | 8/1998 | Mizobata et al. | |
| 5,805,163 A | 9/1998 | Bagnas | |
| 5,813,742 A | 9/1998 | Gold et al. | |
| 5,825,436 A | 10/1998 | Knight | |
| 5,828,420 A | 10/1998 | Marshall et al. | |
| 5,831,615 A | 11/1998 | Drews et al. | |
| 5,835,088 A | 11/1998 | Jaaskelainen, Jr. | |
| 5,880,742 A | 3/1999 | Rao et al. | |
| 5,883,623 A | 3/1999 | Cseri | |
| 5,883,627 A | 3/1999 | Pleyer | |
| 5,883,635 A | 3/1999 | Rao et al. | |
| 5,890,174 A | 3/1999 | Khanna et al. | |
| 5,923,307 A | 7/1999 | Hogle, IV | |
| 5,963,197 A | 10/1999 | Bacon et al. | |
| 5,982,417 A | 11/1999 | Blonde | |
| 5,990,990 A | 11/1999 | Crabtree | |
| 5,999,191 A | 12/1999 | Frank et al. | |
| 6,005,654 A | 12/1999 | Kipfer et al. | |
| 6,016,385 A | 1/2000 | Yee et al. | |
| 6,018,379 A | 1/2000 | Mizobata et al. | |
| 6,031,530 A | 2/2000 | Trueblood | |
| 6,037,937 A | 3/2000 | Beaton et al. | |
| 6,054,969 A | 4/2000 | Haisma | |
| 6,057,814 A | 5/2000 | Kalt | |
| 6,061,110 A | 5/2000 | Hisatake et al. | |
| 6,067,137 A | 5/2000 | Ohnishi et al. | |
| 6,072,489 A | 6/2000 | Gough et al. | |
| 6,075,531 A | 6/2000 | DeStefano | |
| 6,085,202 A | 7/2000 | Rao et al. | |
| 6,111,614 A | 8/2000 | Mugura et al. | |
| 6,114,814 A | 9/2000 | Shannon et al. | |
| 6,118,427 A | 9/2000 | Buxton et al. | |
| 6,163,318 A | 12/2000 | Fukuda et al. | |
| 6,181,349 B1 | 1/2001 | Bardon et al. | |
| 6,204,902 B1 | 3/2001 | Kim et al. | |
| 6,215,538 B1 | 4/2001 | Narutaki et al. | |
| 6,239,852 B1 | 5/2001 | Oono et al. | |
| 6,246,407 B1 | 6/2001 | Wilks et al. | |
| 6,282,551 B1 | 8/2001 | Anderson et al. | |
| 6,300,990 B1 | 10/2001 | Yamaguchi et al. | |
| 6,310,733 B1 | 10/2001 | Dolgoff | |
| 6,317,128 B1 | 11/2001 | Harrison et al. | |
| 6,326,738 B1 | 12/2001 | McAndrew | |
| 6,327,592 B1 | 12/2001 | Yoshikawa | |
| 6,351,298 B1 | 2/2002 | Mitsui et al. | |
| 6,356,281 B1 | 3/2002 | Isenman | |
| 6,369,830 B1 | 4/2002 | Brunner et al. | |
| 6,377,229 B1 | 4/2002 | Sullivan | |
| 6,377,306 B1 | 4/2002 | Johnson et al. | |
| 6,384,840 B1 | 5/2002 | Frank et al. | |
| 6,388,648 B1 | 5/2002 | Clifton et al. | |
| 6,418,426 B1 | 7/2002 | Schlesinger | |
| 6,443,579 B1 | 9/2002 | Myers | |
| 6,466,185 B2 | 10/2002 | Sullivan et al. | |
| 6,468,157 B1 | 10/2002 | Hinami et al. | |
| 6,489,044 B1 | 12/2002 | Chen et al. | |
| 6,496,832 B2 | 12/2002 | Chi et al. | |
| 6,504,587 B1 | 1/2003 | Morishita et al. | |
| 6,505,209 B1 | 1/2003 | Gould et al. | |
| 6,512,559 B1 | 1/2003 | Hashimoto et al. | |
| 6,515,881 B2 | 2/2003 | Chou et al. | |
| 6,525,699 B1 | 2/2003 | Suyama et al. | |
| 6,587,118 B1 | 7/2003 | Yoneda | |
| 6,609,799 B1 | 8/2003 | Myers | |
| 6,610,102 B1 | 8/2003 | Aldred et al. | |
| 6,661,425 B1 * | 12/2003 | Hiroaki | 345/629 |
| 6,693,692 B1 | 2/2004 | Kaneko et al. | |
| 6,694,486 B2 | 2/2004 | Frank et al. | |
| 6,697,135 B1 | 2/2004 | Baek et al. | |
| 6,720,961 B2 | 4/2004 | Tracy | |
| 6,721,713 B1 | 4/2004 | Guheen et al. | |
| 6,725,422 B1 | 4/2004 | Bauchot et al. | |
| 6,760,003 B1 | 7/2004 | Sase | |
| 6,771,327 B2 | 8/2004 | Sekiguchi | |
| 6,812,649 B2 | 11/2004 | Kim | |
| 6,859,907 B1 | 2/2005 | McGarry | |
| 6,906,762 B1 | 6/2005 | Witehira et al. | |
| 6,940,507 B2 | 9/2005 | Repin et al. | |
| 6,947,024 B2 | 9/2005 | Lee et al. | |
| 6,958,748 B1 | 10/2005 | Fukui et al. | |
| 7,016,116 B2 | 3/2006 | Dolgoff | |
| 7,106,275 B2 | 9/2006 | Brunner et al. | |
| 7,113,188 B2 | 9/2006 | Kuroda et al. | |
| 7,262,752 B2 | 8/2007 | Weindorf | |
| 2001/0026625 A1 | 10/2001 | Azima et al. | |
| 2002/0001055 A1 | 1/2002 | Kimura et al. | |
| 2002/0012369 A1 | 1/2002 | Nasu et al. | |
| 2002/0047601 A1 | 4/2002 | Shannon et al. | |
| 2002/0064037 A1 | 5/2002 | Lee | |
| 2002/0091728 A1 | 7/2002 | Kjaer et al. | |

| | | | |
|---|---|---|---|
| 2002/0093516 | A1 | 7/2002 | Brunner et al. |
| 2002/0105516 | A1 | 8/2002 | Tracy |
| 2002/0109684 | A1 | 8/2002 | Repin et al. |
| 2002/0111195 | A1 | 8/2002 | Kweon et al. |
| 2002/0126396 | A1 | 9/2002 | Dolgoff |
| 2002/0163728 | A1 | 11/2002 | Myers |
| 2002/0163729 | A1 | 11/2002 | Myers |
| 2002/0171682 | A1 | 11/2002 | Frank et al. |
| 2003/0043106 | A1 | 3/2003 | Woo |
| 2003/0132895 | A1 | 7/2003 | Berstis |
| 2003/0184665 | A1 | 10/2003 | Berstis |
| 2004/0012708 | A1 | 1/2004 | Matherson |
| 2004/0239582 | A1 * | 12/2004 | Seymour .................. 345/5 |

FOREIGN PATENT DOCUMENTS

| | | |
|---|---|---|
| AU | 25542/99 | 9/1999 |
| AU | 24806/00 | 7/2000 |
| AU | 24538/00 | 8/2000 |
| AU | 68219/01 | 12/2001 |
| BE | 1011678 | 12/1999 |
| CA | 2009960 | 9/1990 |
| CA | 2139696 | 7/1995 |
| CA | 2320694 | 8/1999 |
| CA | 2329702 | 9/1999 |
| CN | 1201157 | 12/1998 |
| EP | 0389123 | 9/1990 |
| EP | 454423 A1 * | 10/1991 |
| EP | 0460314 | 12/1991 |
| EP | 662669 | 1/1994 |
| EP | 595387 | 5/1994 |
| EP | 0605945 | 7/1994 |
| EP | 0703563 | 3/1996 |
| EP | 0802684 | 10/1997 |
| EP | 0935191 | 8/1999 |
| EP | 1057070 | 8/1999 |
| EP | 1058862 | 9/1999 |
| EP | 0999088 | 5/2000 |
| EP | 1151430 | 8/2000 |
| EP | 1177527 | 11/2000 |
| EP | 1 093 008 | 4/2001 |
| EP | 1287401 | 3/2003 |
| FR | 2609941 | 7/1988 |
| GB | 2145897 | 4/1985 |
| GB | 2245092 | 12/1991 |
| GB | 2312584 | 10/1997 |
| GB | 2347003 | 8/2000 |
| GB | 2372618 | 8/2002 |
| IL | 93472 | 11/1994 |
| JP | 3-174580 | 7/1991 |
| JP | 3-226095 | 10/1991 |
| JP | 4-191755 | 7/1992 |
| JP | 5040449 | 2/1993 |
| JP | 6274305 | 9/1994 |
| JP | 8030388 | 2/1996 |
| JP | 8095741 | 4/1996 |
| JP | 09-033858 | 2/1997 |
| JP | 9-308769 | 12/1997 |
| JP | 10-005829 | 1/1998 |
| JP | 10-039782 | 2/1998 |
| JP | 10-039821 | 2/1998 |
| JP | 10-105829 | 4/1998 |
| JP | 10-228347 | 8/1998 |
| JP | 10-301508 | 11/1998 |
| JP | 9308769 | 7/1999 |
| JP | 11205822 | 7/1999 |
| JP | 11272846 | 10/1999 |
| JP | 2000-142173 | 5/2000 |
| JP | 2000347645 | 12/2000 |
| JP | 2001324608 | 11/2001 |
| JP | 2002271819 | 9/2002 |
| NL | 1005868 | 10/1997 |
| NZ | 505801 | 8/2002 |
| NZ | 505800 | 9/2002 |
| WO | 88/05389 | 7/1988 |
| WO | WO99/42889 | 8/1999 |
| WO | 99/44095 | 9/1999 |
| WO | 00/036578 | 6/2000 |
| WO | WO00/36578 | 6/2000 |
| WO | 00/048167 | 8/2000 |
| WO | WO00/48167 | 8/2000 |
| WO | 00/68887 | 11/2000 |
| WO | WO 01/01290 | 1/2001 |
| WO | WO01/15128 | 3/2001 |
| WO | 01/095019 | 12/2001 |
| WO | WO01/95019 | 12/2001 |
| WO | 02/091033 | 11/2002 |
| WO | WO03/003109 | 1/2003 |
| ZA | 9703025 | 11/1997 |

OTHER PUBLICATIONS

Harrison, B., Ishii, H., Vicente, K., and Buxton, W., "Transparent Layered User Interfaces: An Evaluation of A Display Design to Enhance Focused and Divided Attention," 1995, CHI Proceedings.
Courter, G. and Marquis, A., "Mastering Microsoft Office 2000 Professional Edition," 1999 Sybex, Inc.
"Textarc: An Alternate Way to View A Text," http://textarc.org.
"Textarc: The Print and the Artist," http://textarc.org.
"Textarc: NYSCA Grant and Public Installation," http://textarc.org.
"Teamworkstation 1989-1994," http://web.media.mit.edu/~ishii/TWS.html.
"Clearboard 1991-1994," http://web.media.mit.edu/~ishii/CB.html.
Office Action; U.S. Appl. No. 10/048,638; Mail Date Nov. 27, 2007.
Office Action; U.S. Appl. No. 10/048,638; Mail Date Jun. 6, 2008.
Office Action; U.S. Appl. No. 10/048,638; Mail Date Jun. 26, 2006.
Office Action; U.S. Appl. No. 10/048,638; Mail Date Oct. 17, 2005.
Office Action; U.S. Appl. No. 10/048,638; Mail Date Jun. 6, 2007.
Office Action; U.S. Appl. No. 10/048,966; Mail Date Sep. 18, 2007.
Office Action; U.S. Appl. No. 10/048,966; Mail Date May 2, 2007.
Office Action; U.S. Appl. No. 10/048,966; Mail Date Aug. 18, 2006.
Office Action; U.S. Appl. No. 10/048,966; Mail Date Jul. 14, 2005.
Office Action; U.S. Appl. No. 10/048,966; Mail Date Jan. 27, 2005.
Office Action; U.S. Appl. No. 10/049,271; Mail Date Aug. 5, 2008.
Office Action; U.S. Appl. No. 10/049,271; Mail Date Aug. 23, 2006.
Office Action; U.S. Appl. No. 10/049,271; Mail Date Feb. 8, 2006.
Office Action; U.S. Appl. No. 10/049,271; Mail Date May 18, 2005.
Office Action; U.S. Appl. No. 10/049,271; Mail Date Feb. 5, 2008.
Office Action; U.S. Appl. No. 10/049,272; Mail Date Mar. 25, 2008.
Office Action; U.S. Appl. No. 10/049,272; Mail Date Oct. 12, 2007.
Office Action; U.S. Appl. No. 10/049,272; Mail Date Aug. 28, 2006.
Office Action; U.S. Appl. No. 10/049,272; Mail Date Jan. 23, 2006.
Office Action; U.S. Appl. No. 10/049,272; Mail Date Jul. 13, 2005.
Office Action; U.S. Appl. No. 10/049,272; Mail Date Dec. 31, 2003.
Office Action; U.S. Appl. No. 10/476,590; Mail Date Feb. 28, 2008.
Office Action; U.S. Appl. No. 10/476,590; Mail Date Oct. 16, 2007.
Office Action; U.S. Appl. No. 10/476,590; Mail Date Apr. 19, 2007.
Office Action; U.S. Appl. No. 10/476,590; Mail Date Oct. 6, 2006.
Office Action; U.S. Appl. No. 10/476,590; Mail Date Mar. 3, 2006.
Office Action; U.S. Appl. No. 10/519,285; Mail Date May 28, 2008.
Office Action; U.S. Appl. No. 10/519,285; Mail Date Sep. 10, 2007.
Office Action; U.S. Appl. No. 10/841,133; Mail Date Aug. 7, 2008.
Office Action; U.S. Appl. No. 10/841,133; Mail Date Nov. 28, 2007.
Office Action; U.S. Appl. No. 10/841,133; Mail Date Sep. 6, 2007.
Office Action; U.S. Appl. No. 10/841,133; Mail Date Jan. 8, 2007.
Office Action; U.S. Appl. No. 10/049,272; Mail Date May 21, 2007.
Office Action; U.S. Appl. No. 10/049,271; Mail Date Nov. 17, 2004.
Office Action; U.S. Appl. No. 10/049,272; Mail Date Jul. 26, 2004.

* cited by examiner

INSTRUMENTATION

TECHNICAL FIELD

The present invention relates generally to improvements to instrumentation.

BACKGROUND ART

Any potential improvements in the input speed, comprehension and/or retention of information gained from viewing instruments would clearly be beneficial. This is particularly so where the instrument(s) relay critical information such as alarm conditions would be clearly beneficial to a wide spectrum of users, especially in situations where high speed decision making is necessary e.g.: pilots, or other military personnel, drivers, navigators, air traffic control etc.

This is particularly important in situations such as alarm conditions or when critical parameters are being exceeded as any delay in comprehension of the situation can be catastrophic or even fatal in some circumstances. Currently the most effective way of bringing the viewers attention to these situations is by turning the information off and then on again to make it "flash". This flashing usually occurs on a visual display with a single focal plane."

The time taken for the viewer's brain to assimilate this information can substantially reduce the options available in some time-critical situations and any improvement in the speed of comprehension and hence response time would provide a great advantage in these situations.

It is believed that use may be made of the viewers subconscious to enhance the recognised conscious reading mechanisms typically employed during the reading of computer screens, visual displays and so forth.

The manner in which human beings process visual information has been the subject of extensive and prolonged research in an attempt to understand this complex process. The term preattentive processing has been coined to denote the act of the subconscious mind in analysing and processing visual information which has not become the focus of the viewer's conscious awareness.

When viewing a large number of visual instruments, certain variations or properties in the visual characteristics of the instruments can lead to rapid detection by preattentive processing.

This is significantly faster than requiring a user to individually scan each instrument, scrutinising for the presence of the said properties.

Exactly what properties lend themselves to preattentive processing has in itself been the subject of substantial research. Colour, shape, three-dimensional visual clues, orientation, movement and depth have all been investigated to discern the germane visual features that trigger effective preattentive processing.

Researchers such as Triesman [1985] conducted experiments using target and boundary detection in an attempt to classify preattentive features. Preattentive target detection was tested by determining whether a target element was present or absent within a field of background distractor elements. Boundary detection involves attempting to detect the boundary formed by a group of target elements with a unique visual feature set within distractors.

It maybe readily visualised for example that a red circle would be immediately discernible set amongst a number of blue circles. Equally, a circle would be readily detectable if set amongst a number of square shaped distractors.

In order to test for preattentiveness, the number of distractors as seen is varied and if the search time required to identify the targets remains constant, irrespective of the number of distractors, the search is said to be preattentive. Similar search time limitations are used to classify boundary detection searches as preattentive.

A widespread threshold time used to classify preattentiveness is 200–250 msec as this only allows the user opportunity for a single 'look' at a scene. This timeframe is insufficient for a human to consciously decide to look at a different portion of the scene. Search tasks such as those stated above maybe accomplished in less than 200 msec, thus suggesting that the information in the display is being processed in parallel unattendedly or pre-attentively.

However, if the target is composed of a conjunction of unique features, i.e. a conjoin search, then research shows that these may not be detected preattentively. Using the above examples, if a target is comprised for example, of a red circle set within distractors including blue circles and red squares, it is not possible to detect the red circle preattentively as all the distractors include one of the two unique features of the target.

Whilst the above example is based on a relatively simple visual scene, Enns and Rensink [1990] identified that targets given the appearance of being three dimensional objects can also be detected preattentively.

Thus, for example a target represented by a perspective view of a cube shaded to indicate illumination from above would be preattentively detectable amongst a plurality of distractor cubes shaded to imply illumination from a different direction.

This illustrates an important principle in that the relatively complex, high-level concept of perceived three dimensionality may be processed preattentively by the sub-conscious mind.

In comparison, if the constituent elements of the above-described cubes are re-orientated to remove the apparent three dimensionality, subjects cannot preattentively detect targets which have been inverted for example. Additional experimentation by Brown et al [1992] confirms that it is the three-dimensional orientation characteristic which is preattentively detected.

Nakaymyama and Silverman [1986] showed that motion and depth were preattentive characteristics and that furthermore, stereoscopic depth could be used to overcome the effects of conjoin. This reinforced the work done by Enns Rensink in suggesting that high-level information is conceptually being processed by the low-level visual system of the user.

To test the effects of depth, subjects were tasked with detecting targets of different binocular disparity relative to the distractors. Results showed a constant response time irrespective of the increase in distractor numbers.

These experiments were followed by conjoin tasks whereby blue distractors were placed on a front plane whilst red distractors were located on a rear plane and the target was either red on the front plane or blue on the rear plane for stereo colour (SC) conjoin tests, whilst stereo and motion (SM) trials utilised distractors on the front plane moving up or on the back plane moving down with a target on either the front plane moving down or on the back plane moving up.

Results showed the response time for SC and SM trials were constant and below the 250 msec threshold regardless of the number of distractors. The trials involved conjoin as the target did not possess a feature unique to all the distractors.

However, it appeared the observers were able to search each plane preattentively in turn without interference from distractors in another plane.

This research was further reinforced by Melton and Scharff [1998] in a series of experiments in which a search task consisting of locating an intermediate-sized target amongst large and small distractors tested the serial nature of the search whereby the target was embedded in the same plane as the distractors and the preattentive nature of the search whereby the target was placed in a separate depth plane to the distractors.

The relative influence of the total number of distractors present (regardless of their depth) verses the number of distractors present solely in the depth plane of the target was also investigated. The results showed a number of interesting features including the significant modification of the response time resulting from the target presence or absence.

In the target absence trials, the reaction times of all the subjects displayed a direct correspondence to the number of distractors whilst the target present trials did not display any such dependency. Furthermore, it was found that the reaction times in instances where distractors were spread across multiple depths were faster than for distractors located in a single depth plane.

Consequently, the use of a plurality of depth/focal planes as a means of displaying information can enhance preattentive processing with enhanced reaction/assimilation times.

It is thus believed that a means of overcoming the above described drawbacks is available by harnessing the peripheral vision and subconscious perception of the reader to assimilate additional information sources simultaneously with the process of the conventional reading of the instruments in order to enhance the speed and effectiveness of the whole reading/viewing process.

This would have particular relevance to the displaying of alarm situations as this is when the time (or lack of it) in which to respond to the information on a display is most critical.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to an aspect of the present invention there is provided a method of displaying information on an instrument for viewing by a user
characterised by the steps of
a) displaying information on a first focal plane, and
b) moving the information displayed on the first focal plane to a different focal plane when an alarm or critical situation arises, and
c) then moving the information back to the first focal plane, and
d) repeating steps b) and c) in order that the viewer of the instrument becomes aware of the displayed information.

According to a further aspect of the present invention there is provided an instrument for displaying information for viewing by a user, including
a visual display system including at least two single level screens spaced physically apart to form a multi-level screen, and
information on a first focal plane
characterised in that
when an alarm or critical situation arises the information displayed on the first focal plane will move to a different focal plane and then back to the first focal plane in order that the viewer of the instrument become aware of the displayed information.

It should be understood that within the present specification the term "information" may consist of alpha-numeric characters, symbols, plain text, images, a combination of the same or any other means of visually representing information.

In preferred embodiments of the present invention the information will be displayed on a multi-level three-dimensional display device such as that disclosed in New Zealand Patent Number 505800.

However this should not be seen to be a limitation on the present invention in any way as in other embodiments the information may be displayed on any display device that has more than one focal plane.

It is envisaged that within preferred embodiments of the present specification a control circuit will have access to a number of system parameters in order that when a parameter goes beyond its specified level then the control circuit will signal to the display in order that the appropriate information displayed on the first focal plane will move to another focal plane and then back to the first focal plane so that the viewer will become aware of the displayed information and can therefore can take steps to rectify the situation.

Preferably the movement of the information between focal planes is done a number of times—sufficient for the viewer to become aware of the displayed information.

It should be understood that throughout the present specification the term "alarm or critical situation" should be understood to mean when a system parameter is exceeded or an external influence has to be taken account of. For example, in a military situation this could be the proximity of another object such as a plane, missile etc., or it can even be the receiving of a signal such as a radar-lock from a missile.

The techniques of making a viewer preattentively aware are described in the background art section of this specification and within this explanation it makes it clear that moving information from one focal plane to another is a very fast and effective method for inducing preattentive awareness.

One of the extreme advantages of this technique is that the viewer need only have the information in their peripheral vision for the technique to be effective. This fact alone will vastly improve the reaction time to an alarm as when preattentive techniques are not used then the viewer generally needs to focus on the alarm information in order to comprehend its relevance or meaning.

According to another aspect of the present invention there is provided a method of displaying information for viewing by a user, including
at least two focal planes, and
a control system
characterised by the steps of:
a) displaying primary information in a distinct colour or pattern on a first focal plane, and
b) displaying secondary information in a distinct colour or pattern on at least a second focal plane, and
c) when the primary and secondary information overlap or come into a proximity that is commensurate with an alarm situation the displayed information will change colour or pattern so that the viewer will become aware of this information.

According to yet another aspect of the present invention there is provided an instrument for displaying information for viewing by a user, including a visual display system including at least two single level screens spaced physically apart to form a multi-level screen, and primary information displayed in a distinct colour or pattern on the first focal plane of the instrument, and secondary information displayed in a distinct colour or pattern on at least the second focal plane of the instrument, characterised in that when the primary and secondary information overlap or come into a proximity that is commensurate with an alarm situation the displayed information will change colour or pattern so that the viewer will become aware of this information.

It should be further understood that within the present specification the terms "primary information" and "secondary information" are not intended to infer or suggest any hierarchical relationship or degree of relative importance between the primary and secondary information. In general the terms are used to disseminate between information on different focal planes within the display.

The term pattern is intended to mean a distinct configuration. For example, a first pattern may be a series of horizontal lines within the second pattern vertical lines. The resultant new pattern formed by an overlap may be hatched grid indicating an alarm situation.

Preferably the information is represented by colour.

Due to the fact that the primary information and the secondary information are displayed on separate focal planes within the screen the area of overlap will automatically be a combination of the two colours i.e.: the colour of the primary information and the colour of the secondary information.

This means that no special control or software will be necessary to change the colour of the overlapped area as the image on the second focal plane can clearly be seen through the first focal plane as this is a transparent plane and therefore when the secondary information passes behind part or all of the primary information the colour of the image seen by the viewer will change accordingly.

It is understood that in preferred embodiments of the present invention the colour of the primary information and the colour of the secondary information will be quite distinct so as to form a new distinct colour when they are combined by an overlap of the information e.g.: if the primary information was yellow and the secondary information was blue then the overlapped area would clearly be green, this is an easily disseminatable colour from either yellow or blue and would therefore be easily and quickly recognised by the viewer.

In some embodiments of the present specification the instrument will be capable of using both of the described methods for displaying information, however this should not be seen to be a limitation on the present invention in any way as in other preferred embodiments only one of the methods will be able to be displayed on the instrument.

When an alarm or critical situation is detected by the circuits to which the instrument is connected the circuit will instruct the instrument to display the information as described, in order that the viewer of the instrument will be able to preattentively assimilate that an alarm or critical condition has been detected.

The most significant advantage of the present invention is that by using the preattentive trigger described within this specification rather than just a flashing of the information (or a separate lamp) the viewer of the information will be able to assimilate the information or the condition more rapidly, which will in turn provide the viewer with a greater time in which to react to the situation.

It is accepted that with a lot of instruments the time in which the viewer will need to react to the information being displayed will be sufficient for most normal methods of relating the alarm situation to the viewer.

However, particularly for military and avionic applications the time in which a decision has to be reached, or remedial action needs to be initiated, can be incredibly short and any improvement to the viewer's reaction time or ability to assimilate the information more readily and rapidly will provide a distinct and possibly life-saving advantage.

The present invention has many distinct and substantial advantages over any method available before, as stated previously the greatest of these is that due to the faster perception time to an alarm situation the remedial action can be initiated more rapidly which in turn will substantially increase the chance of the remedial action being successful.

Another advantage is that in applications that currently use the separate alarm panel, by using the instruments disclosed within the present specification these panels will become obsolete therefore freeing up space in what is generally a confined environment.

A further advantage in these applications is that the viewer will have less areas in which to scan for relevant information and will therefore have lower fatigue levels than would presently be encountered.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
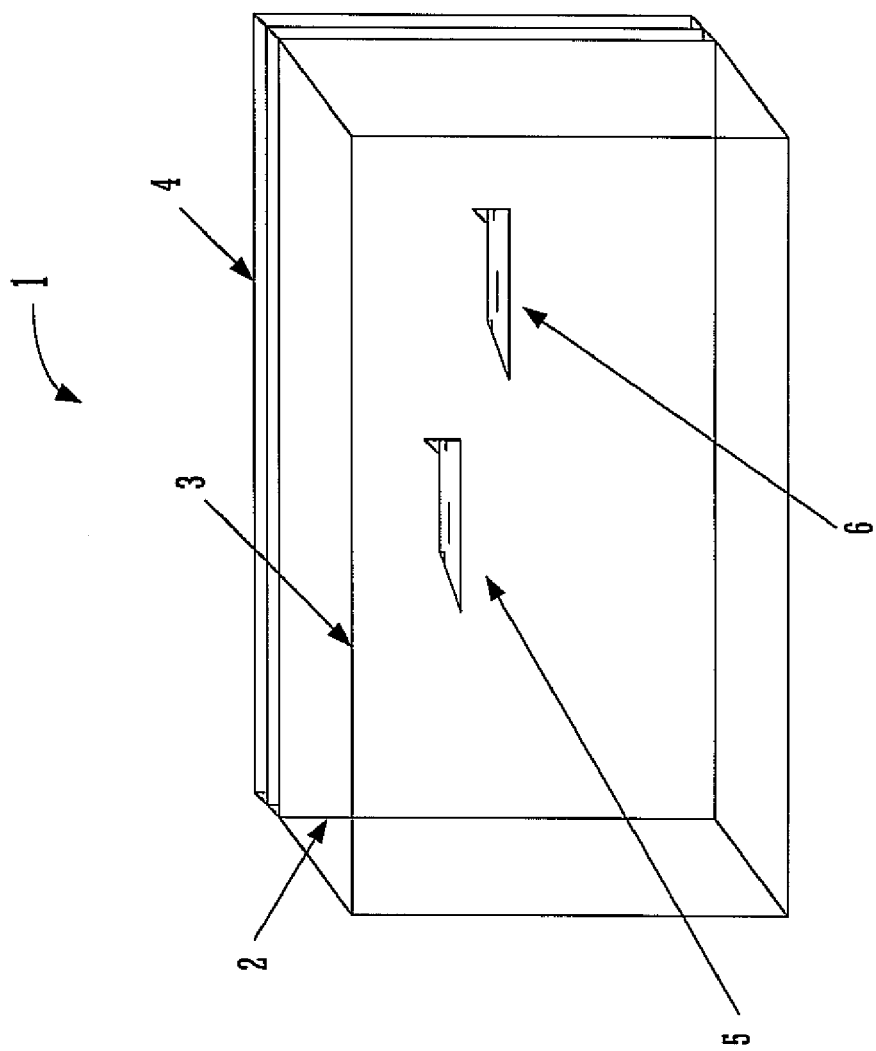
FIG. 1 is a simplified perspective view of a dual screen display operating in accordance with one preferred embodiment of the present invention.

With reference to FIG. 1 there is shown an instrument containing a multi focal plane display generally indicated by arrow 1.

The instrument for displaying information or instrument display 1 consists of a background screen (2) in a parallel orientation with, but spaced apart from, a foreground screen (3).

In FIG. 1 both screens (2, 3) are transparent liquid crystal displays (LCD) panels, although the invention is not necessarily limited to the use of these displays.

A back light (4) is located behind the background screen (2) to provide illumination for the entire instrument display (1).

Each of the screens (2, 3) are capable of displaying either primary (5) or secondary (6) information.

FIG. 1 shows the primary information (5) is displayed on the foreground screen (3) and secondary information (6) is displayed on the background screen (2).

It should be appreciated however that the reverse situation is equally feasible with the primary information (5) being displayed on the background screen (2) and the secondary information (6) being displayed on the foreground screen (3).

It should also be appreciated that in a lot of applications only one piece of information (5, 6) will be shown on the instrument display (1). This information (5, 6) can be on either the background screen (2) or the foreground screen (3).

When the displayed information (5, 6) reaches a critical parameter or "alert level" the information will oscillate between the background screen (2) and the foreground screen (3) in order that the viewer will become preattentively aware that a critical situation is developing or has developed already.

In applications where both primary information (5) and secondary information (6) are present on the instrument display (1) either of the two methods of preattentiveness may be used.

For example:

a) When the primary information (5) and the secondary information (6) overlap or come into a proximity that is commensurate with an alarm situation the displayed information (5, 6) will change colour so that the viewer will be aware of this information.

Due to the transparency of the focal planes within the display, when the primary information (5) and the secondary information (6) overlap the combination of their colours will be displayed.

Figure 2A:
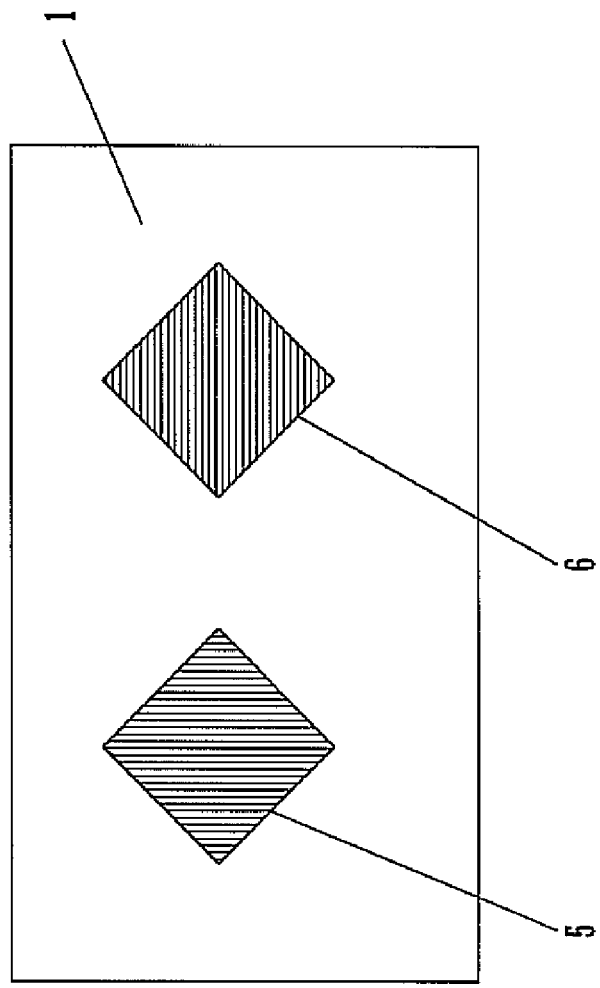
FIGS. 2A–2B are schematic front views of a display in accordance with an embodiment, showing primary and secondary information prior to a "critical situation" and after such a "critical Situation" occurs, respectively.
Figure 2B:
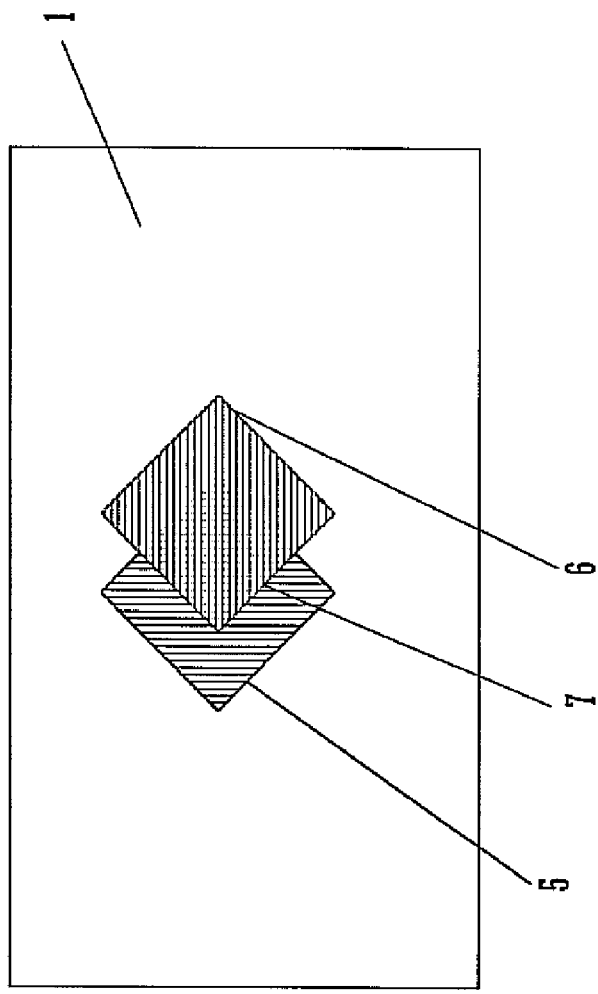

As discussed previously if the colours of the primary information (5) and the secondary information (6) are chosen carefully then the colour of the overlapped information (5, 6) would be obviously different to the viewer. The example mentioned earlier was if the primary information (5) was yellow and the secondary information (6) was blue then the colour of the overlap (5, 6) would be green. FIGS. 2A–2B show an embodiment in which the primary and secondary information (5.6) are displayed in first and second patterns, respectively, and a new pattern (7) is formed when the first and second patterns overlap.

b) If either the primary (5) or secondary (6) information reaches a critical or alarm level then the appropriate information (5,6) will oscillate between the background screen (2) and the foreground screen (3) thereby making the viewer preattentively aware of the situation.

Aspects of the present invention have been described by way of example only and it should be appreciated that modifications and additions may be made thereto without departing from the scope of the appended claims.

I claim:

1. A method of displaying information on an instrument, said method comprising the steps of:
   (a) displaying information on a first focal plane;
   (b) moving the information displayed on the first focal plane to a different second focal plane when an alarm or critical situation arises;
   (c) then moving the information back to the first focal plane; and
   (d) repeating steps (b) and (c) in order that a viewer of the instrument becomes preattentively aware of the alarm or critical situation.

2. The method of claim 1, wherein step (d) comprises controllably repeating steps (b) and (c) for alerting the viewer of the instrument of the alarm or critical situation.

3. The method of claim 1, further comprising
   arranging first and second LCD (liquid crystal display) panels one in front of another, and a common backlight unit behind said LCD panels, said first and second LCD panels defining said first and second focal planes, respectively; and
   powering said common backlight unit during step (d) to use both LCD panels for alerting the viewer of the instrument of the alarm or critical situation.

4. The method of claim 1, further comprising:
   connecting a control circuit to a system;
   accessing, by said control circuit, to a number of parameters of said system;
   when a parameter among said parameters of said system is at, or goes beyond, a specified level, automatically signaling, by the control circuit, the instrument to perform steps (b)–(d) so that the viewer becomes preattentively aware of the alarm or critical situation.

5. A method of displaying information using at least two focal planes, said method comprising the steps of:
   (a) displaying primary information in a first distinct color or pattern on a first focal plane;
   (b) displaying secondary information in a second distinct color or pattern on at least a second focal plane; and
   (c) when the primary and secondary information overlap or come into a proximity that is commensurate with an alarm situation, the displayed information will change color or pattern so that a viewer will become preattentively aware of the alarm or critical situation.

6. The method of claim 5, wherein, in step (c), an overlapping region of said primary and secondary information is displayed in a third distinct color or pattern which is a combination of said first and second colors or patterns.

7. The method of claim 5, further comprising positioning said second focal plane behind said first focal plane which is transparent, and allowing the secondary information to be visible through said transparent first focal plane simultaneously with said primary information being displayed on said first focal plane.

8. The method of claim 5, further comprising positioning said second focal plane behind said first focal plane which is transparent, wherein, in step (c), said secondary information is displayed simultaneously with said primary information and visible through at least a part of said primary information.

9. An instrument for displaying information, comprising:
   a visual display system including at least two single level screens spaced physically apart to form a multi-level screen, each of said level screens representing a focal plane; and
   information on a first focal plane;
   wherein when an alarm or critical situation arises, the information displayed on the first focal plane will move to a different focal plane and then back again so that a viewer becomes preattentively aware of the alarm or critical situation.

10. The instrument as claimed in claim 9, further comprising a control circuit which has access to a number of parameters for a system to which said circuit is connected in order that when a parameter is at, or goes beyond, a specified level, then the control circuit will signal to the visual display system in order that the appropriate information displayed on the first focal plane will move to another focal plane and then back to the first focal plane so that the viewer becomes preattentively aware of the alarm or critical situation.

11. The instrument as claimed in claim 9, wherein the information will be displayed on a visual display system including at least two single level screens spaced physically apart to form a multi-level screen display device.

12. The instrument in claim 11, further comprising a control circuit which has access to a number of parameters for a system to which said circuit is connected in order that when a parameter is at, or goes beyond, a specified level, then the control circuit with automatically signal to the visual display system in order that the appropriate information displayed on the first focal plane will move to another focal plane and then back to the first focal plane so that the viewer becomes preattentively aware of the alarm or critical situation.

13. An instrument for displaying information, comprising:
a visual display system including at least two single level screens spaced physically apart to form a multi-level screen, each of said level screens representing a focal plane and being configured to display a variety of colors and/or patterns; and
primary information displayed in a distinct color or pattern on the first focal plane of the instrument; and
secondary information displayed in a distinct color on at least the second focal plane of the instrument;
wherein when said primary and secondary information overlap, or come into a proximity, the displayed information will change color or pattern so that a viewer of the instrument becomes preattentively aware of the displayed information.

14. The instrument as claimed in claim 13, wherein the color or pattern of the primary information and the color or pattern of the secondary information form a new distinct color or pattern when they are combined by an overlap of the information.

15. The instrument as claimed in claim 13, wherein
said level screens include a background screen and a foreground screen placed in front of said background screen; and
said foreground screen is operable to simultaneously display said primary information and be transparent to allow the secondary information display by the background screen to be visible through said foreground screen.

16. The instrument as claimed in claim 13, further comprising a control circuit for repeatedly moving the primary information back and forth between the first and second focal planes when an alarm or critical situation associated with said primary information arises in order to alert the viewer of the alarm or critical situation.

17. The instrument as claimed in claim 13, wherein said level screens comprise first and second transparent LCD (liquid crystal display) panels defining said first and second focal planes, respectively;
said instrument further comprising a backlight unit common for both said first and second LCD panels, said backlight unit being placed behind said LCD panels.

* * * * *